Oct. 6, 1953 G. A. DUIS ET AL 2,654,491
VEHICLE LIFT GATE
Filed Oct. 4, 1951 8 Sheets-Sheet 3
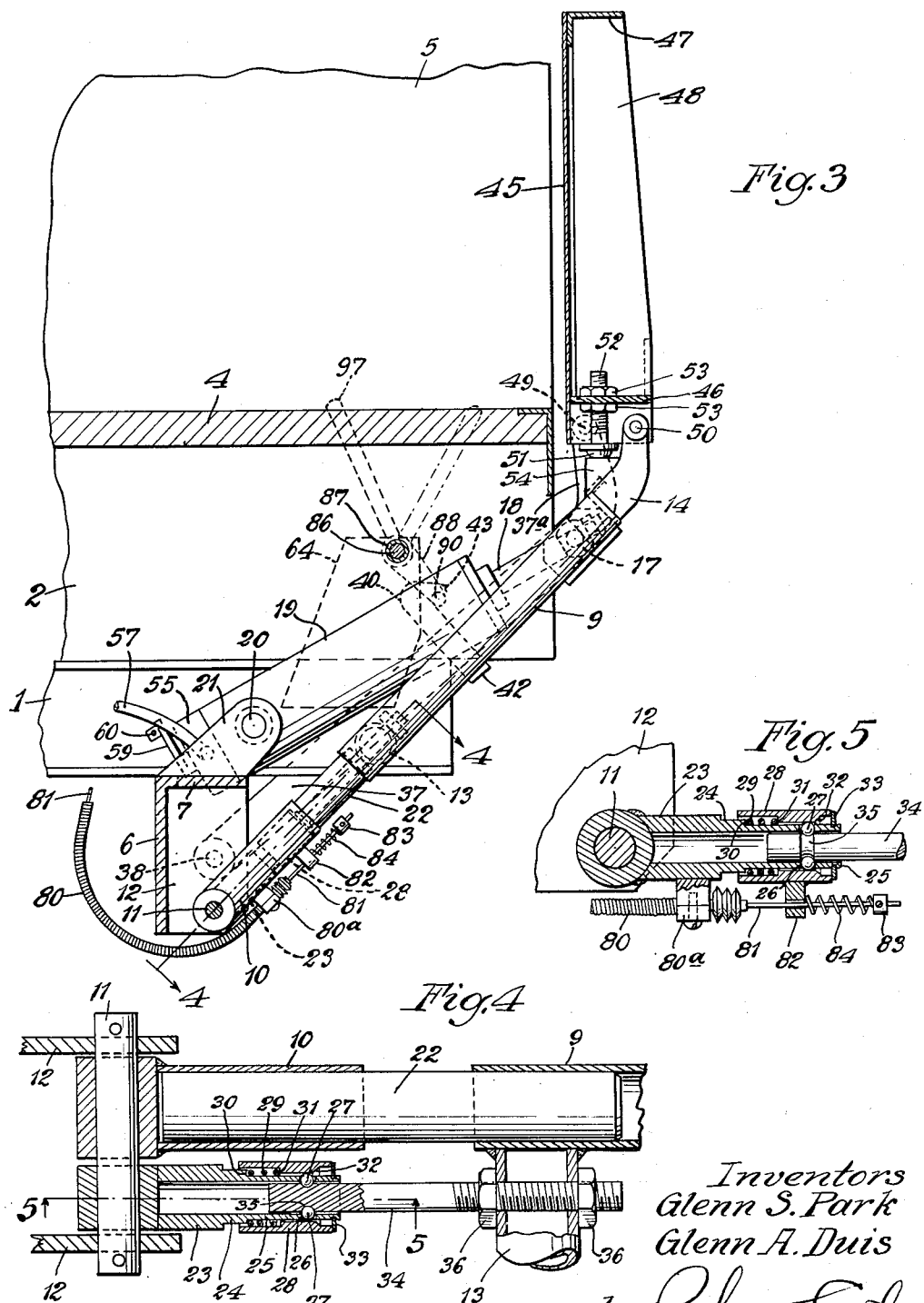
Inventors
Glenn S. Park
Glenn A. Duis
by Parker & Carter
Attorneys Oct. 6, 1953
G. A. DUIS ET AL
2,654,491
VEHICLE LIFT GATE
Filed Oct. 4, 1951
8 Sheets-Sheet 4
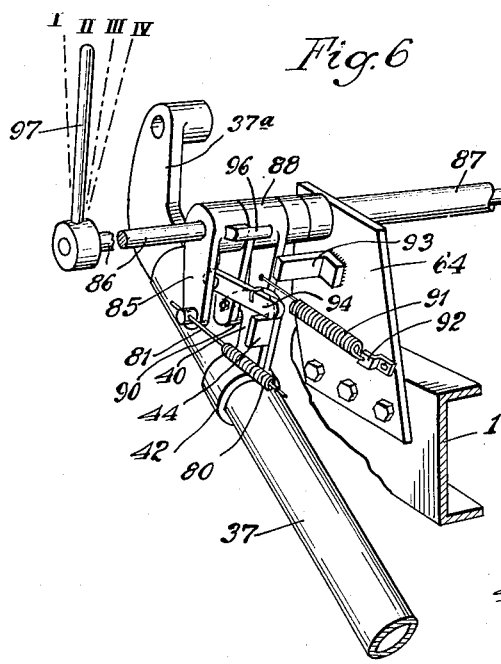
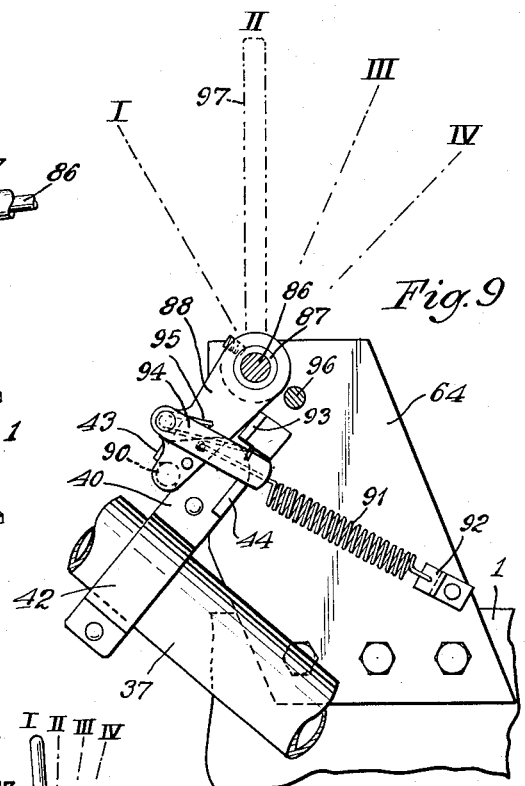
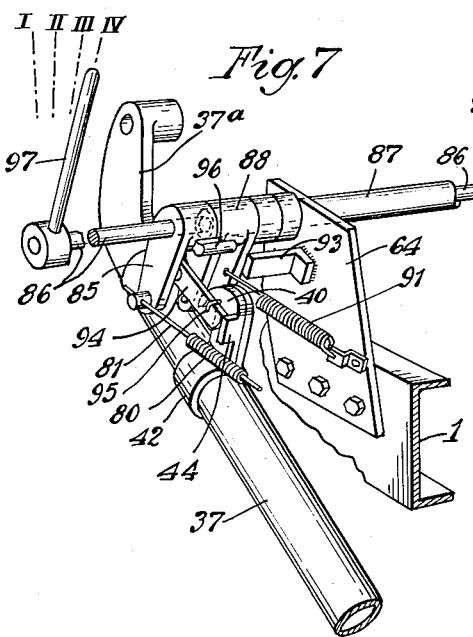
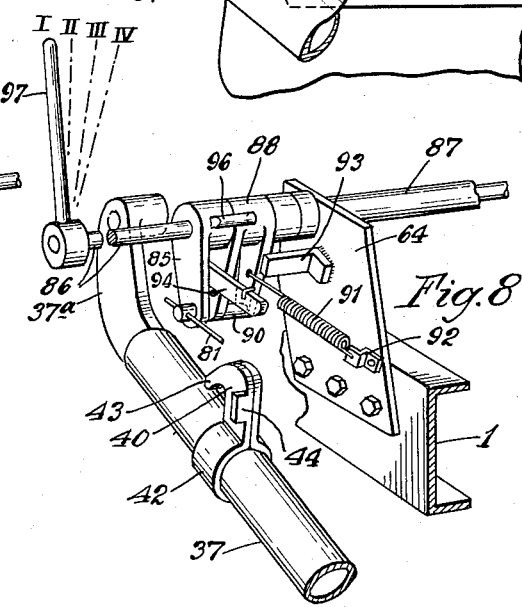
Inventors
Glenn S. Park
Glenn A. Duis
by Parker & Carter
Attorneys

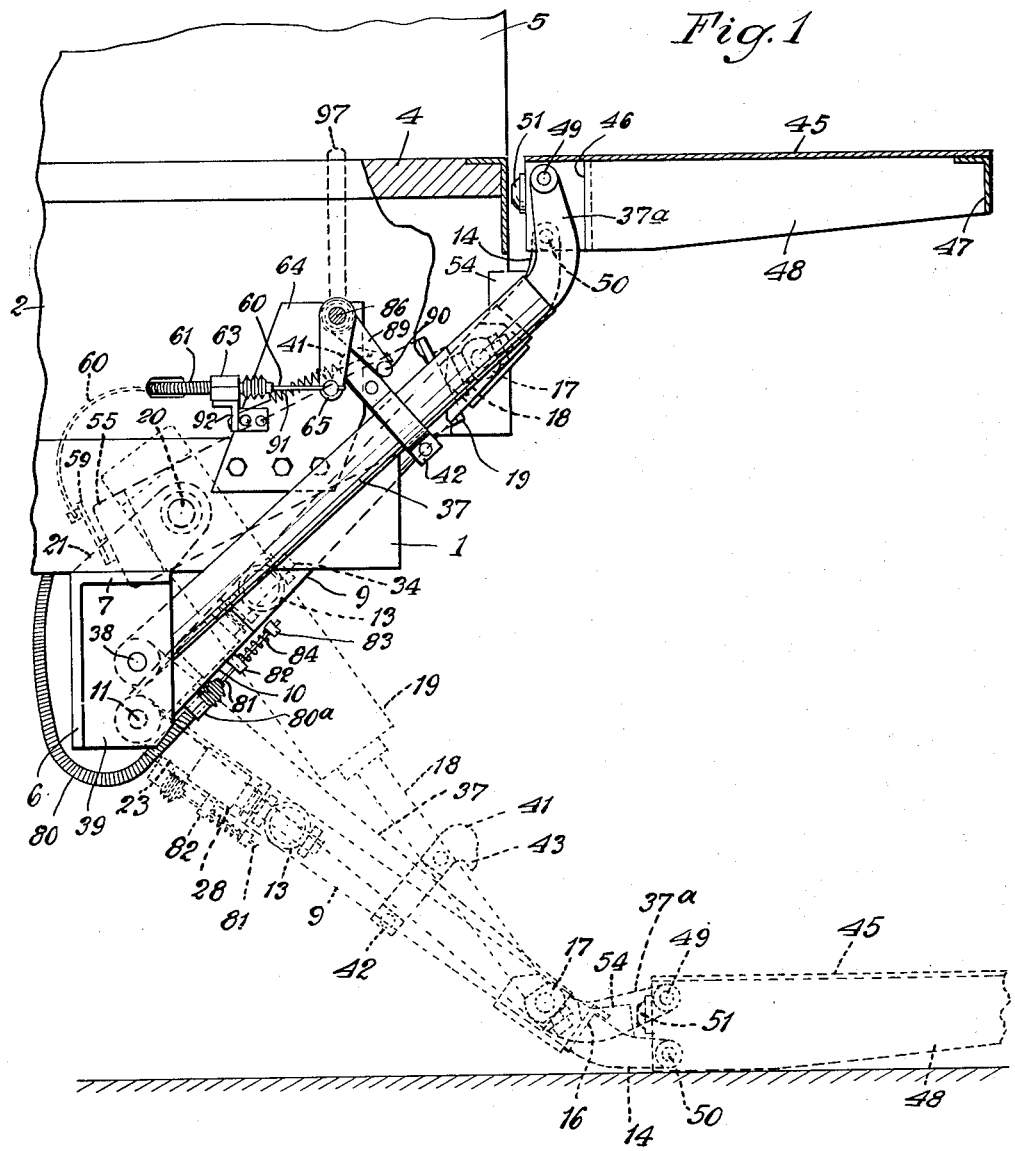

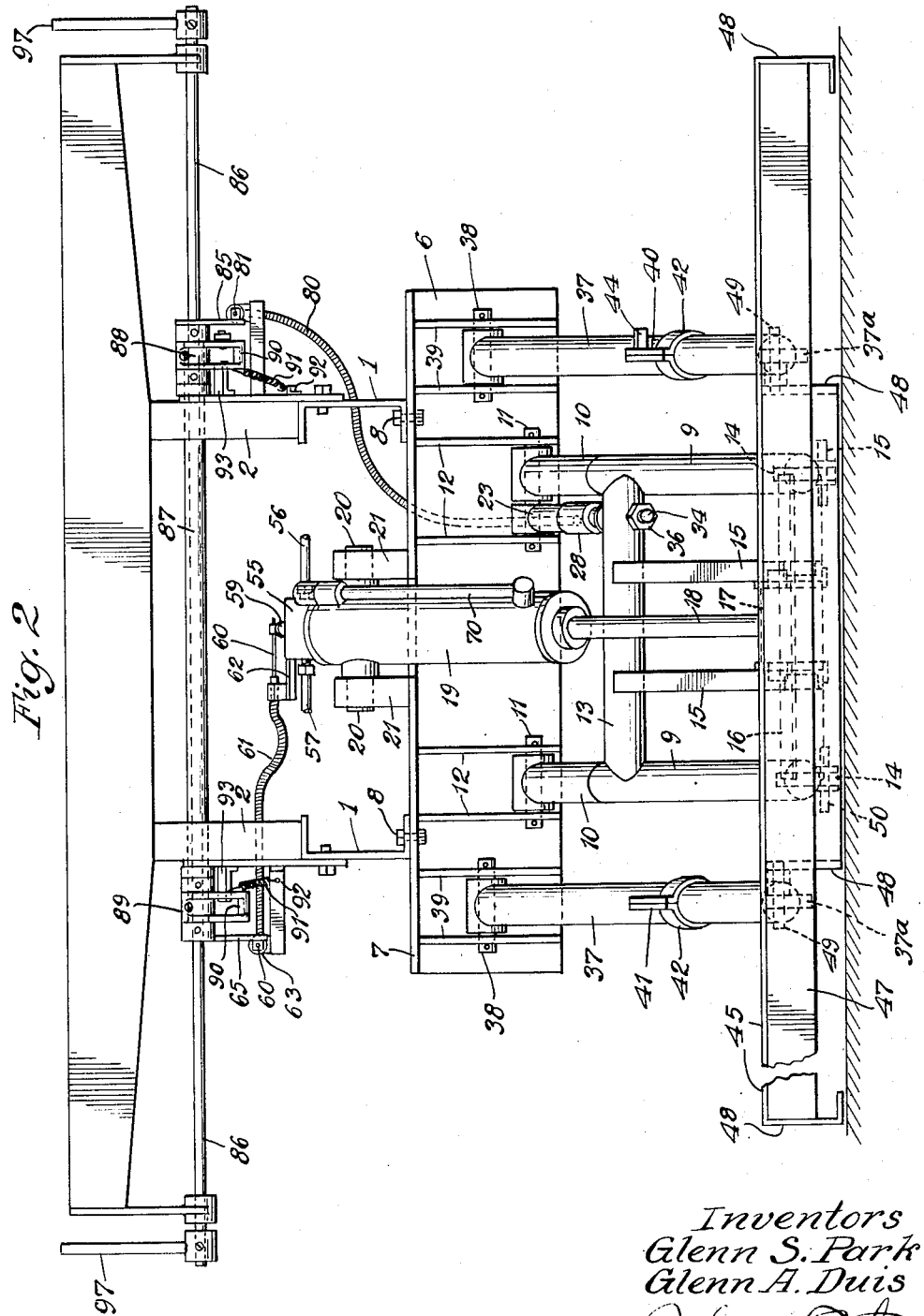

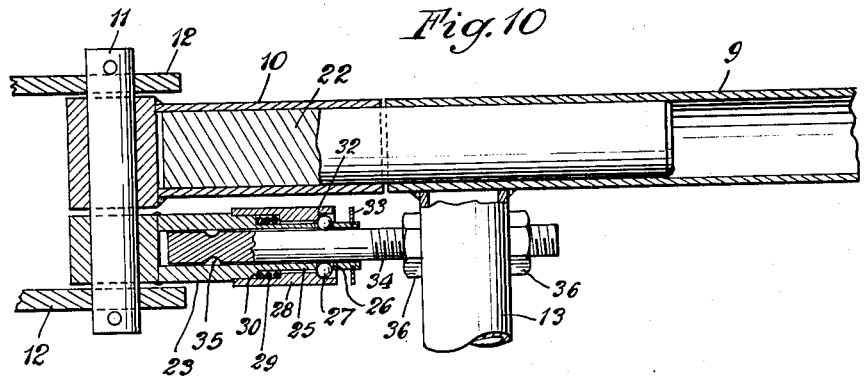
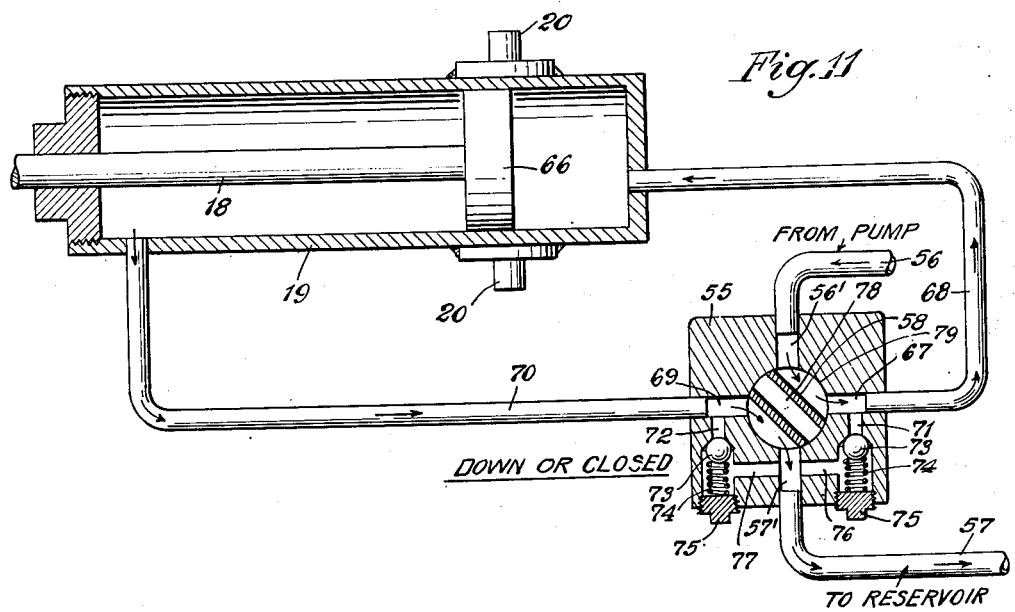
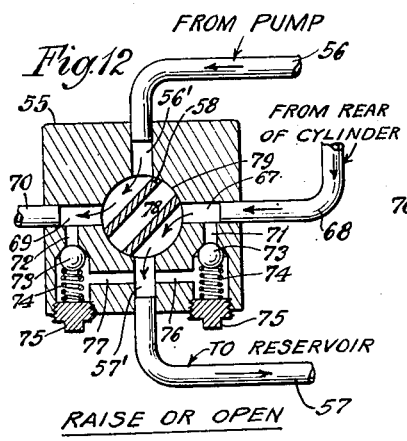
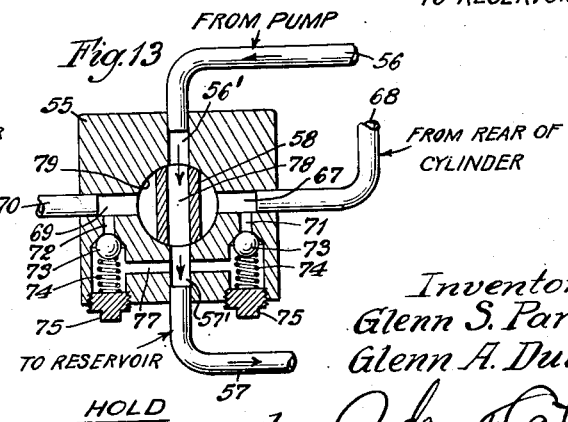

Oct. 6, 1953  G. A. DUIS ET AL  2,654,491
VEHICLE LIFT GATE
Filed Oct. 4, 1951  8 Sheets-Sheet 6
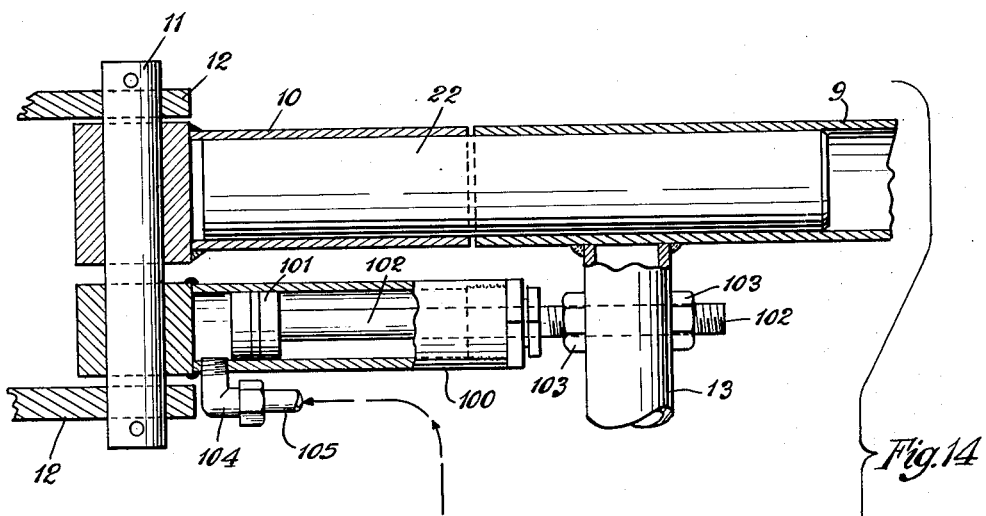
Fig. 14
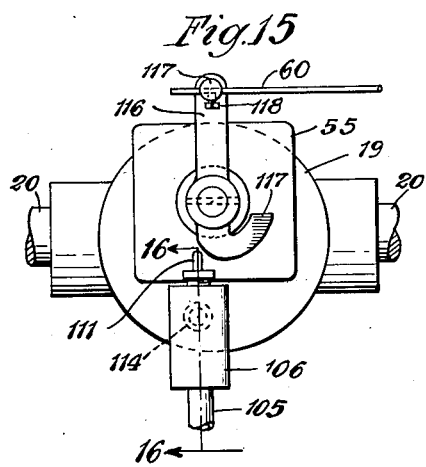
Fig. 15
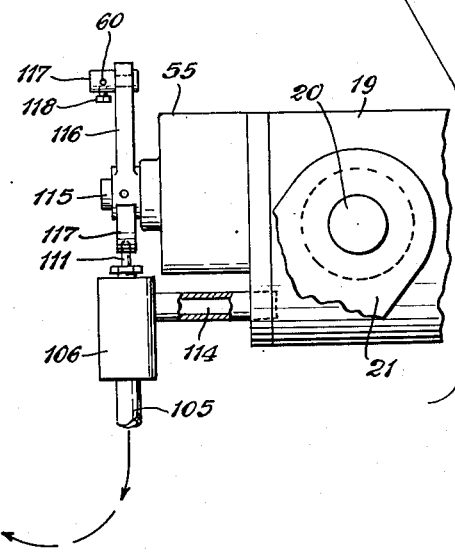
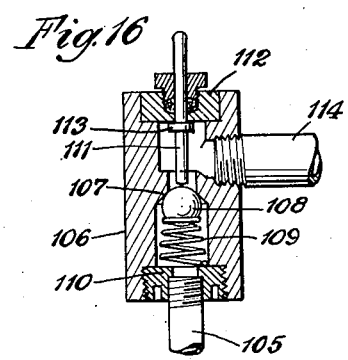
Fig. 16
Inventors
Glenn S. Park
Glenn A. Duis
by Parker & Carter
Attorneys Oct. 6, 1953 — G. A. DUIS ET AL — 2,654,491
VEHICLE LIFT GATE
Filed Oct. 4, 1951 — 8 Sheets-Sheet 7

Inventor
Glenn S. Park
Glenn A. Duis
by Parker & Carter
Attorneys

Oct. 6, 1953  G. A. DUIS ET AL  2,654,491
VEHICLE LIFT GATE

Filed Oct. 4, 1951  8 Sheets-Sheet 8

Inventors
Glenn S. Park
Glenn A. Duis
by Parker & Carter
Attorneys

Patented Oct. 6, 1953

2,654,491

UNITED STATES PATENT OFFICE 2,654,491

VEHICLE LIFT GATE

Glenn A. Duis and Glenn S. Park, Streator, Ill., assignors to Anthony Company, Streator, Ill., a corporation of Illinois Application October 4, 1951, Serial No. 249,666

9 Claims. (Cl. 214—77)

This invention relates to a vehicle body and particularly to the gate which is or may be associated with a vehicle body. In one form, the invention is embodied in a vehicle gate which corresponds generally to the so-called "tail gate" of a vehicle body, and one object of the invention is to provide a tail gate which is arranged for lifting.

The device thus comprises a vehicle tail gate arranged to act as an elevating platform, elevator, or lifting member.

One object of the invention is to provide, in connection with an apparatus of the type indicated, means for moving the gate after it has been raised into an upright or closing position.

Another object is to provide means whereby the main gate lifting power source or power means is utilized also to act as the gate closing means.

Another object is to provide, in connection with a lift gate, means whereby the gate lifting mechanism may be made effective to close the gate after lifting.

A further object is to provide means for operating the control of the lift gate by one simple lever.

Other objects will appear from time to time through the specification and claims.

The invention is illustrated more or less diagrammatically in the accompanying drawings, wherein:

Figure 1 is a side elevation of one form of the device and with parts omitted, the gate being in the raised position;

Figure 2 is a rear elevation of the device of Figure 1, the gate being in the lowered position;

Figure 3 is a side elevation of the gate raising mechanism with gate and vehicle parts in section showing the gate in the closed position;

Figure 4 is a sectional detail taken at line 4—4 of Figure 3 on an enlarged scale;

Figure 5 is a sectional detail taken at line 5—5 of Figure 4;

Figure 6 is a perspective of a portion of the latching mechanism with the latch engaged in the holding or lock position;

Figure 7 is a perspective of the latch mechanism with the latch and control mechanism in the release position;

Figure 8 is a perspective view illustrating the latch mechanism and control mechanism in position for lowering;

Figure 9 is a side elevation with parts in section, and with the control lever omitted;

Figure 10 is a sectional detail generally similar to Figure 4 and showing the locking means in the unlocked position;

Figure 11 is a schematic flow diagram of the hydraulic system involved in the device, with a valve which is shown as a schematic sectional view in the down or closed position;

Figure 12 is a schematic sectional view of the valve in the raised or open position;

Figure 13 is a schematic sectional view showing the valve in the "hold" position;

Figure 14 is a diagrammatical fragmentary view of a modified holding means;

Figure 15 is an end view of the cylinder portion;

Figure 16 is a section taken at line 16—16 of Figure 15 on an enlarged scale;

Like parts are designated by like characters throughout.

Figure 17:
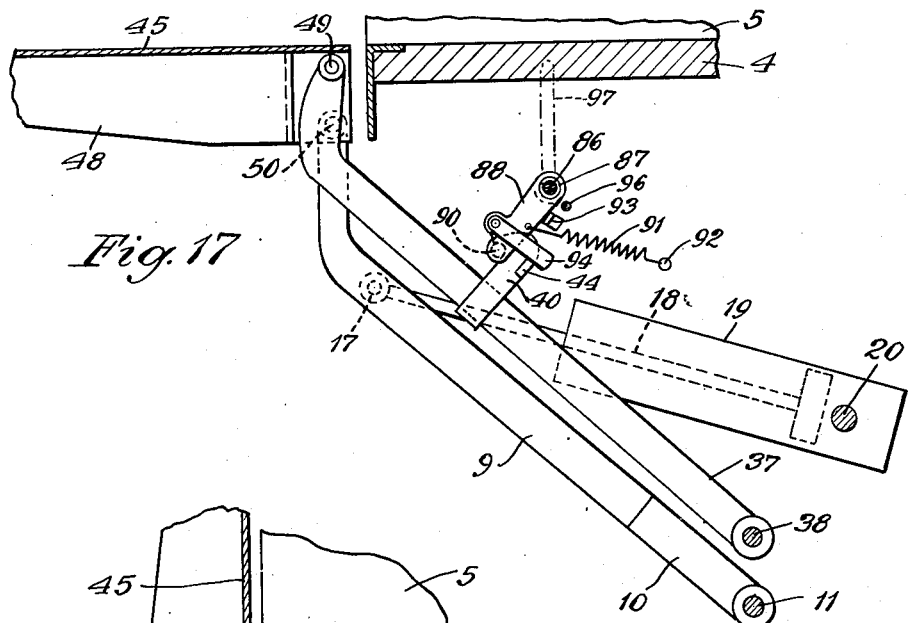
Figure 17 is a schematic view showing the invention with the gate in a "raised" position.

The device as shown may be mounted on any base or support. While it will ordinarily find its greatest utility mounted on a vehicle, the device is not limited to such a mounting, and it may be mounted upon any base or support. In some installations, the device is mounted on a fixed support and serves merely as an elevator or elevating means. In other installations, it is mounted upon a vehicle such as a truck, trailer or a tractor. In the form shown, it is indicated as being mounted upon the frame of a truck. This is a convenient and useful mounting association because the device is designed to operate by hydraulic pressure fluid, and when mounted on a vehicle, the pressure fluid may be readily supplied by a pump driven from the power source of the vehicle.

As shown, only so much of the vehicle appears as to indicate the general arrangement and association of parts. It is to be understood that the vehicle has an engine, and that the engine is supplied with a power take-off. By means of the power take-off, the pump, not shown is driven and supplies pressure fluid to the hydraulic system of the lift gate assembly. Ordinarily, a truck or tractor of the type suitable for receiving the device includes the chassis and suitable frame therefor. The frame members of such a chassis are indicated as at 1, 1. Body frame members are indicated at 2, 2 and such frame members may be of any desired construction. The invention is, of course, in no way limited to any particular body frame or body construction.

Transverse frame members will ordinarily be associated with any body or platform, and floor or body members 4 may be present. The floor of the body is indicated merely diagrammatically to show that some wood carrying, surface forming member is present. It is immaterial for the the purposes of the present invention what the details of this may be, and it is also immaterial whether or not the floor member is enclosed or provided with side walls. Side walls are indicated at 5, and they may be present if desired.

A lift gate supporting member 6 may be used, and it is convenient if this member is present to mount or support many of the parts of the lift gate assembly upon the member 6. As shown, the member 6 includes a flange 7, and this flange is fastened with the chassis frame members of the truck with bolts 8, or rivets or other fastening means. One convenient feature of the present invention, as generally practiced, lies in the fact that the total lifting assembly of the lift gate may conveniently be carried on or attached to the member 6, and the device is, in a sense, a complete unitary assembly which may be largely, or wholly, assembled at a factory and shipped out as a unit to a customer for mounting on a body or frame of a tractor. The device is, in this sense, a "package" item and requires a minimum of separate assembly at the point of use. This is not an essential feature of the invention, but it is a convenient and frequently advantageous application.

The gate assembly, in addition to the member 6, includes a plurality of pairs of arms. Actually, as shown in Figure 2 in particular, there are two pairs of arms. An inner pair of arms is formed of the members 9, 9. These members are formed in two parts and include the generally long sections 9 and shorter sections 10. The sections 10 are pivoted as at 11 between webs 12 which are themselves secured to the frame member 6 and its flange 7. The members 9 are joined by the connecting member 13 which may be of tubular construction, as shown particularly in Figure 4, or may be otherwise formed. Each of the members 9 is provided, adjacent its outer or free end, with a relatively curved connecting portion 14. This portion is arranged for attachment with the gate as will be described below.

Positioned between the members 9, 9 and extending outwardly toward the free ends of those members, is a pair of stiffening or strengthening parts 15. These members, as shown particularly in Figure 2, are at one end secured to the transverse member 13. At their opposite ends, they are secured to a transverse member 16. Trunnioned between the members 15 is a cross head 17 to which is pivoted the outer or free end of the piston rod 18. This piston rod is connected to a piston, not shown, which is mounted for movement within a cylinder 19. The cylinder 19 is pivoted as at 20 between extensions or supporting members 21, 21 mounted upon the transverse flange 7 which is itself attached to the member 6 or forms a part of the member 6. The piston and cylinder assembly might be supported elsewhere, but it is convenient to support them, as shown, from the member which carries the major part of the lift gate assembly.

As shown, particularly in Figures 4, 5, and 10, the portions 9 and 10 form together the two pairs of the inner arms which are, in effect, two part arms and which are arranged telescopically. Fixed within the portion 10 is a member 22 which extends also into the tubular portion 9. As shown in Figure 4, the parts are in the expanded or "long" position. As shown in Figures 2 and 10, the parts are in the collapsed or "short" position. Thus the members 9 and 10 of each pair and the corresponding member 22 form, in effect, a telescopic arm of variable length. Since the two arms, as shown particularly in Figure 2, are formed identically and are of identical size, they form a pair of telescopic arms joined by the transverse member 13. There are two pivot points 11, one for each arm, about which the arms pivot and rotate together on a common axis when the gate mechanism is raised and lowered.

Under certain conditions, and particularly during the main raising and lowering movement of the gate, the arms formed by the members 9 and 10 are in the short position, as shown in Figure 10. They move to the long or expanded position of Figures 3 and 4 when the gate is moved to the closed or upright position of Figure 3. At that time the length of the arms 9 is extended, and the arms expand because of their telescopic arrangement, and their length is increased by a distance indicated generally by the space between the ends of the members 9 and 10 where they face each other. Since the gate will frequently remain in the closed position of Figure 3 for extended periods, and particularly when the truck upon which it is mounted is being driven or moved from place to place, it is convenient and desirable to provide a holding means whereby the gate is held in the upright position. In this position the arms formed of the members 9 and 10 are extended and in the long position. One suitable form of latch or locking means for holding the arm members in the extended position is illustrated generally in Figure 2 and more in detail in Figures 4 and 10. This latch includes a cylindrical member 23 pivoted on one of the pivot members 11 of one of the members 10. As shown in Figure 2, this is the right-hand member 10. Two such latches might be provided, or if a single latch is used, it might be adjacent either of the members 10, or it might be positioned elsewhere so long as it is effective to hold the arm assembly in the extended or long position. The cylindrical member 23 is reduced as at 24 and is further reduced as at 25, thus providing in effect two shoulders. It is provided with one or more perforations 26, within which balls 27 are positioned. A sleeve 28 is slidably mounted on the free end of member 23 and overlies the balls and a portion of the sleeve. A spring 29 is mounted within the sleeve 28 and may bear against a shoulder 30 formed by the reduced portion 24. At its opposite end, the spring 29 bears against a shoulder 31 formed on the inside of the sleeve 28. The sleeve is tapered adjacent its opposite end as at 32. A limiting member 33 is mounted on the outer end of the cylindrical portion 23 and acts as a stop for the sleeve 28.

A rod 34 is provided with an annular groove 35 positioned as shown particularly in Figures 4 and 10, and the rod 34 is fixed in the transverse member 13 through which it extends, and it is held in adjustable position in that member by nuts 36. The sleeve 28 may be moved axially with respect to the cylindrical portion 23 about which it is mounted. The manner and means by which this movement of the sleeve is accomplished will be described below.

A pair of preferably separate arms 37 is pivoted as at 38 between pairs of webs 39 which are fastened to the member 6, 7. The pivot point 38 of the arms 37 is generally positioned in vertical alignment above the pivot points 11 of the inner arm. Each of the arms 37 is provided, adjacent its free end, with a curved portion 37a which is pivoted to the gate as will be described below, and upon each of the arms there is preferably mounted latch members 40 and 41. The latch members 40 and 41 may be made in many different ways, but, as shown, each includes a cylindrical or rounded portion 42 which engages the arm 37 upon which the latch is mounted. The latches include hook portions 43, as shown generally in the figures, and the latch 40 includes a laterally directed lug 44. Ordinarily, it is not necessary to have the corresponding lug on the opposite latch member 40.

The gate member may be formed in many different ways, and the particular details of the gate shown herewith indicate merely one suitable gate construction. The gate will include a surface forming member 45 and a frame portion formed of members 46 at the hinge edge of the gate, a member 47 in the opposite end of the gate, and additional frame portions 48, 48 formed at the side portions of the gate, and, if desired, formed or positioned at intermediate portions of the gate. Four such members are shown in the gate at Figure 2.

The arms 37 are pivotally connected to the gate by the members 37a which are pivotally joined to the gate as at 49. The arms 9 of the inner pair of arms are pivotally connected to the gate as at 50.

One or more cushioning stop members 51 may be secured adjacent the rear or hinge edge of the gate. These stop members include cushioning parts of rubber or other compressible material, natural or synthetic. These parts are mounted upon the heads of bolts 52 which are adjustably mounted by nuts 53 in the frame portion 46 of the gate. These cushion stop members 51 contact abutments 54 when the gate is in the closed position as shown in Figure 3. These abutment members 54 may be carried at any desired part of the hinge and framework structure by means of which the gate itself is supported. The effect of the contact between the members 51 and the abutments 54 is to place the gate linkage under compression and to prevent vibration and rattling when the gate is in the closed position of Figure 3.

The hydraulic system includes a pump or other means for supplying pressure fluid under suitable pressure. No pump is shown, as the invention is not limited to the association with any particular type of pump. Pumps of many types may be used, and since hydraulic systems are well known in the market today, it is sufficient to say that the device will operate with any one of many pumps now available on the market. A convenient type of pump is a gear pump in which two meshing gears are rotated from a power take-off driven by the engine of the truck upon which the gate is mounted. Whatever the particular type of pump chosen may be, it is preferably mounted on or supported from the vehicle frame or the body, and it is convenient to provide a valve which is mounted upon the cylinder and moves with it. The valve is shown generally in Figures 1, 2, and 3, and includes a housing 55 fixed upon the end of the cylinder 19 and forming, in effect, an extension of the cylinder structure. It is, of course, hydraulically separate from the cylinder except by means of the passages shown in particular in Figures 11, 12 and 13 and described below.

Pressure fluid is directed to the pump housing through a conduit 56, which may be flexible, and pressure fluid moves from the valve housing 55 through the conduit 57 to a reservoir or sump not shown. Although the conduit members 56 and 57 may be of any construction and material within the fixed requirements of the pressure which they must maintain, it is convenient to form them of flexible material. Such material is generally freely available on the market.

Within the pump housing 55 is mounted a rotary valve member 58. This valve member extends at one end out of the valve housing 55 as shown in Figure 2. As there shown, there is secured to the exposed end of the valve a valve operating lever 59. A flexible wire 60 is secured to the member 59 at its free end and is enclosed in a flexible sleeve or guide 61. The guide is supported upon an arm or abutment 62 fixed in the valve housing 55 as shown in Figure 2. At its opposite end the sleeve or housing 61 which encloses the wire 60 is mounted on a support or abutment 63 carried on a plate 64 which is itself fixed to one of the frame members 1 of the vehicle chassis. This member 64 and the associated wire and guiding parts are shown in particular in Figures 1 and 2. The end of the wire 60 which is farthest from the valve operating lever 59 is secured to a lever arm 65. The details of the movement of this arm will be described below. It is sufficient for the present to say that the arm in its swinging movement moves the wire 60, and thus moves the operating lever 59 to rotate the valve member 58.

The schematic showing of the hydraulic system which appears in Figures 11, 12 and 13 illustrates the valve and valve housing, the pump and cylinder, the associated conduit or communication passages, and three main positions of adjustment of the valve. As shown in Figures 11, 12 and 13 the piston 66 is mounted upon the inner end of the piston rod 18 and within the cylinder 19. The valve housing 55 is provided with a passage 56' with which the inner conduit 56 is connected. Correspondingly, the valve housing is provided with a passage 57' to which is connected the conduit 57 which leads to the reservoir or sump. The valve housing is also provided with a third passage 67 to which a conduit 68 is connected. This conduit or passage leads, as shown in Figure 11 in particular, to the cylinder 19, and through it pressure fluid is discharged into the cylinder on that side of the piston 66 which will cause the piston to move out of the cylinder. A fourth passage 69 is formed within the valve housing 55, and to it is connected a rear conduit or passage 70. This passage is shown in Figure 2 particularly, and it extends to the opposite side of the piston 66 and is connected to the cylinder 19 adjacent its free or outer end. Through the conduit 70 pressure fluid may move to or return from the cylinder. The construction of the hydraulic system is such that pressure fluid may be discharged under pressure to either side of the piston, and thus the piston is caused to move under power conditions in either of two selected directions. When pressure fluid is directed to one side of the piston and moves the piston, pressure is discharged from the cylinder by the piston movement and returned to the valve housing from the opposite side of the piston.

To each of the passages 67 and 69 is joined overload release passages 71 and 72 respectively. These passages have positioned to control them ball check valves of conventional design including balls 73, compression springs 74, and adjusting plugs or screws 75. Each of the passages 71 and 72 is connected by the transverse passages 76 and 77 respectively to the main, outer passage 57' which communicates with the reservoir through the conduit 57.

The rotary valve member 58, which is positioned within the valve housing 55, is provided with a transverse passage 78, and it is positioned within a cavity 79 in the valve housing 55. The rotary member 58 is of such size or shape that it may, in certain positions, close all but one passage or path through the valve housing, and, in other positions, it may open a plurality of paths through the housing. For each valve setting, the direction of fluid flow is indicated by arrows. As shown in Figure 11, the valve setting is for the down or closed position. In that position, fluid under pressure moves from the pump through the conduit 56 passage 67 and conduit 68 and enters the cylinder 19 above the piston 66 and acts in a direction to move to the piston to the left, as shown in Figure 11, and to carry the piston rod out of the cylinder, and thus to lower the gate from the full line position of Figure 1 to the dotted line position of that figure. With the valve in this position, pressure fluid is expelled from below the piston and moves from the cylinder through the conduit 70, the passage 69, and passage 57', and finally through the conduit 57 to the reservoir or sump. The expression "down" or "closed" is used because, in this position of the valve, and depending upon the position of the gate latching means which are described below, the gate will either be lowered to the dotted line position of Figure 1 or closed to the position of Figure 3. By means described below, the movement of the piston in this outward direction is thus selectively effective either to lower the gate as a whole to the downward position or to close the gate from the full line position of Figure 1 to the vertical, raised position of Figure 3.

With the valve in the position of Figure 12, pressure fluid is directed oppositely from the direction in which it is directed when the valve is as shown in Figure 11. As shown in Figure 12, pressure fluid moves from the pump through the conduit 56, the passage 56', the passage 69, and the conduit 70 to the left side of the piston and moves the piston inwardly within the cylinder. This movement of the piston is effective either to raise the gate structure as a whole from the dotted line position of Figure 1 to the full line position of Figure 1 or, depending upon the latch adjustment, the same piston movement may be effective to move the gate from the vertical, raised position of Figure 3 to the horizontal, raised position of Figure 1.

The valve as shown in Figure 13 is adjusted to hold the gate in whatever position it may occupy. As thus shown, pressure fluid is not directed to the cylinder, but is by-passed from the pump through the valve housing and returned to the reservoir or sump. Pressure fluid moves from the pump through the conduit 56, the passage 56', and central passage 78 of the member 58, and thence moves outwardly through the passage 57' and conduit 57 to the reservoir or sump. In this position of the valve, it acts to block flow to or from the cylinder, and thus it is effective to seal and retain pressure fluid within the cylinder.

The purpose of the overload release valve 73 is to provide a safety measure. Should excessive pressures develop on either side of the piston for any reason, such excessive pressure is effective to unseat the balls 73 and thus to open a passage back through the cross passages 76 or 77 to the outlet passage 57', and thence through the conduit 57 to the reservoir or sump.

The latch means which are illustrated in detail in Figures 4 and 10 are provided with a control means shown in Figure 5. As there shown, there is secured to the cylinder member 23 an abutment 80a to which is secured one end of a housing or guide 80. Within this guide is slidably mounted a wire 81. The wire passes through a perforated abutment 82 fixed to the sleeve 28. As its outer or free end, the wire has fixed to it a stop 83. A spring 84 is positioned about the wire 81 and bears at one end against the abutment 82. The wire 81 thus serves as a means for moving the locking sleeve 31. The spring 84 provides a cushioning connection between the wire 81 and the lug 82. The end of the wire 81 opposite or farthest from the sleeve 28 is secured to a lever arm 85 which is mounted upon and fixed to a control shaft 86.

We have described above the locking or latching means shown primarily in Figures 4, 5, and 10. This latching means is effective to latch the central arm members formed of the parts 9 and 10 in the extended or longest position, as shown in Figure 4. This is the position which the parts assume when the gate is moved to the vertical or closing position of Figure 3.

In addition to this latching means, there is a latch means for latching the entire structure of the gate and gate moving parts in the raised or full line position of Figure 1. This latching means includes the latches 40 and 41 which are maintained on the outside arms 37 and which appear in Figures 1, 2, 3, and 6 to 9, inclusive. The latch 40 is illustrated in perspective in Figures 6, 7 and 8 and is illustrated in elevation in Figure 9 in connection with the members which engage it. The latch 41 is engaged by corresponding members which are shown generally in Figure 2. The description of the latch 40 and the parts which engage it will, therefore, suffice for a description of the latches 40 and 41 and the members which engage them.

A sleeve 87 is positioned about the control shaft 86 and has fixed to it hook members which engage the latches 40 and 41. As shown, there are hooks 88 and 89. Each is mounted on the sleeve 87. While these hooks may be of various designs, it is convenient to form each hook with a portion which is fixed to the sleeve 87 and with a pair of serrated arm-like portions between each of which is a latch-engaging transverse member 90. Springs 91 are connected each at one end to one of the hooks 88 or 89, and each spring is engaged at its other end with an abutment 92 which is fastened to the part 64 or to any desirable part of the assembly. Stops 93 are also fixed to the members 64, and the springs 91 are biased to move the latches 88 and 89 toward the stops 93. The springs 91 thus tend to move the sleeve 87 in the direction which would bring the hooks 88 and 89 in contact with their respective stops 93.

Pivoted to the hook member 88 is a limit member 94. A torsion spring 95, positioned as shown particularly in Figure 9, bears at one end against the hook member 88 and at the other end against the limit 94 and is biased to move the member 94 in clockwise direction, as shown in Figure 9. In one position, the limit member, as shown in Figure 7, contacts the lug 42 on the latch 40 and limits the movement of the sleeve 87. When, however, the parts are in the position of Figures 6 and 9, the stop 94 is raised to clear the lug 44 and thus the latch member 40 may engage the hook 88, as shown in Figures 6 and 9, and correspondingly the latch 41 on the opposite arm 37 will engage the hook member 89 since both hook members are secured to the sleeve 87 and move with it. When the limit member 94 contacts the lug 44, therefore, neither of the hooks 88 or 89 can engage the latch members 40 or 41. When, however, the limit is raised, so that it does not contact the lug 44, each hook engages its respective latch. As shown in Figures 6, 7 and 8, there is provided on the hub of the lever 85, which engages the shaft 86, a dog 96.

The modified form of holding means shown in Figures 14, 15 and 16 comprises a hydraulic holding means, whereas the holding means shown particularly in Figures 4, 5, and 10 comprises a mechanical means. Each has, however, the main purpose of providing means effective to hold the telescopic arms in extended position.

As shown in Figure 14, a cylinder 100 takes the place of member 23 of the earlier figures and is positioned about the pivot member 11. A piston 101 is mounted to reciprocate within the cylinder 100 and a piston rod 102 which is fastened to the piston extends outside of the cylinder through suitable packing not shown in detail and is fastened to the transverse member 13 and is held in adjusted relation therewith by nuts 103, or otherwise.

An inlet 104 is connected by a conduit 105 which is preferably flexible to a valve housing 106 which is supported upon the cylinder 19 in a manner described below.

The valve housing 106 with which the conduit 105 communicates is provided with an internal seat 107 within which a ball 108 is seated. A spring 109 is positioned within the housing 106, bears at one end against a seat 110 and at the other against the ball 108. The spring is biased to hold the ball seated. 111 is a valve operating stem slidably positioned within a closure 112. It carries a stop member 113 which may bear against the inner face of the closure 112. The member 111 is adapted to be reciprocated to dislodge the ball 108 from the seat 107 in opposition to the spring 109. A conduit 114 serves as a support for the valve housing 106 and supports it from the cylinder 19. It serves also as a conduit communicating with the interior of the cylinder on the right or upper side of the cylinder 19 in the diagram of Figure 11. It will be understood that the cylinder in the Figure 14 is reversed, end for end, from the position shown in Figure 11.

The valve housing 55 as shown in the diagrammatical Figures 11, 12 and 13, appears also in Figure 14. The showing of the internal construction of the valve is not repeated in connection with Figures 14 and 15. The rotary valve member 58, shown in detail in Figures 11, 12 and 13 is positioned within the valve housing 55 of these figures and of Figure 14. It is provided with a shaft 115 which projects outside of the housing 55 as shown in Figures 14 and 15 and to it is fixed an operating handle 116. This handle is provided with a cam portion 117 which is positioned to contact and to move the stem 111 and by its movement to control the opening or seating of the ball valve 108. The operating wire 60 is connected to the handle 116 and may conveniently be positioned within the pivotedly mounted member 117 which is positioned at the outer end of the handle 116. A set screw 118 fastens the wire 60 in adjusted position in the member 117.

We have shown and described in connection with the modified structure only so much of the piston, cylinder and valve assembly as are necessary to explain the insertion of the hydraulic holding cylinder 100 in the system.

The use and operation of this invention are as follows:

The device, as shown, is intended primarily for use in a vehicle such as a truck, trailer or tractor, and it comprises a member which acts as a platform and may be considered a gate. This is the member which has the surface part 45 and the associated frame or stiffening structure therefor.

Means are provided for raising this member from and lowering it to the ground or other surface upon which the vehicle stands. Generally, a vehicle comprises a frame or comparable structure upon which the body or load carrying surface is mounted. The gate is arranged to move to and from the ground, so that it may be used as an elevator either to raise material from the ground to the level of the body or to lower material from the level of the body to the ground. To accomplish this, the structure, which includes the two outer arms 37 and the two inner, telescopic arms 9, 10 is supported from the vehicle frame or from the body or otherwise. Although it is generally convenient to support this structure from the vehicle frame, it may be supported on any convenient location or part of the assembly.

The means for raising and lowering the gate include the piston and cylinder assembly, including the cylinder 19, the piston 66, and the piston rod 18. The cylinder is movably, and preferably pivotally, mounted in the assembly, and the piston rod is connected at some convenient point to the arm structure or to the gate itself, so that movement of the piston and consequent movement of the piston rod in and out with respect to the cylinder will move the gate to raise or lower it.

When the gate assembly is mounted on a truck, the cylinder is supplied with pressure fluid by a pump which is driven from the truck engine. Obviously, the invention is not limited to this feature, and the pump might be driven by a separate engine or any driving means. Generally, trucks are provided, or may be provided, with power take-off means, and it is convenient to use these means for driving a pump which furnishes fluid under pressure to the piston and cylinder assembly. Valve means are provided to control the flow of the pressure fluid and thus to control the movement of the gate up and down. These valve means may be located wherever desired. One convenient location, which is shown herewith, is upon the cylinder itself, and the valve means are, in this form of the invention, positioned within the housing 55 which is secured upon the cylinder 19.

For many purposes, it is desirable to provide means for moving the gate after it has been raised into "closing" position, since, as above pointed out, the gate assembly may be mounted upon a truck conveniently. The lifting gate may also be used as the means for closing the end of the body which is mounted upon the truck. Whether this be a closed body or so-called "stake" body or a body of any construction, it is generally desirable to have a gate at the end of the body which may be moved to a closing position to prevent accidental displacement of the load of the truck or truck body. And the gate, when so arranged, serves as a lifting and closing gate.

The movement from the full line position of Figure 1 to the dotted line position is merely the up and down movement of the gate when it acts as a lowering platform. In the reverse movement, the gate acts as a raising platform. When now the gate is moved from the full line position of Figure 1 or Figure 17 to the position of Figure 3 or Figure 18, it acts as a closure to close the body or to provide a closure for that portion of the member 4 adjacent which it stands, as shown in Figure 3. In the past, in some cases, the gate has been moved from the elevated position to the closing position manually. Attempts have been made to move the gate to the closing position mechanically, and these attempts, so far as it is known, have been embodied in mechanisms which include a separate power source for closing the gate. This may, for example, be a separate hydraulic motor or a separate hydraulic piston and cylinder assembly. Any such provision of a separate power source involves added complication, added weight, and added expense, and it is one of the objects of the present invention to provide means whereby the power source by means of which the gate is raised and lowered may also be used as the power source for closing the gate. Thus, the necessity for a second or auxiliary power source for closing is eliminated.

Figure 18:
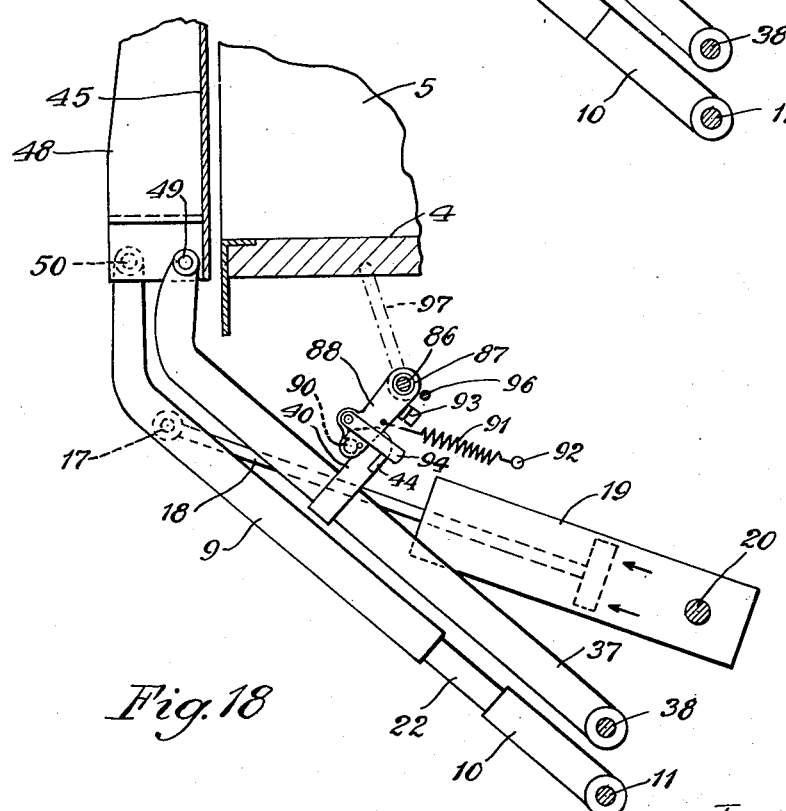
Figure 18 is a schematic view showing the invention with the gate in a closed position.

In the present invention, the gate is moved to the closing position of Figure 3 or Figure 18 by the same piston and cylinder assembly which moved the gate to the raising position. This is accomplished by using a double acting piston and cylinder assembly so arranged that pressure fluid is introduced selectively on either side of the piston to control the direction of movement of the gate. In addition to the selective control of the direction in which the pressure fluid is supplied, latching means are provided to latch the gate in the raised position, as shown in full lines in Figure 1, and illustrated schematically in Figure 17. When the gate is latched in this position, the movement of the piston is effective to raise the gate to the closing position of Figure 3.

Figure 19:
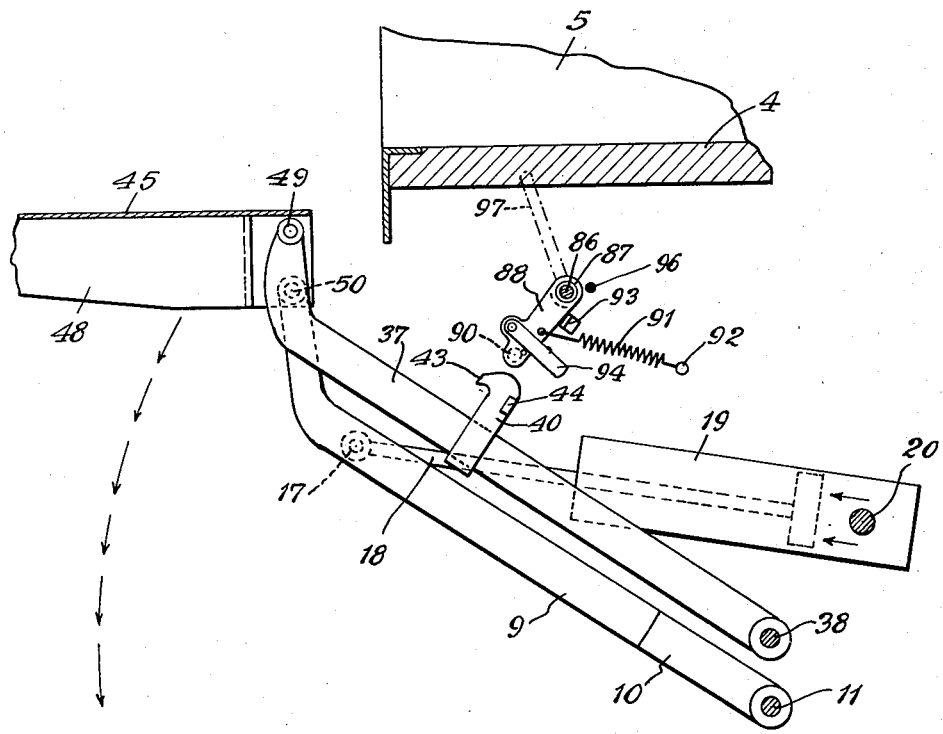
Figure 19 is a schematic view showing the invention with the gate intermediate its lowermost position and its raised position.

As will be noted in Figure 17, the latch 90 actually restrains movement of the arm or supporting connector 37 and, accordingly, the pivot point 49 on the gate. Reversing the actuator 19 applies a thrust through supporting arm or connector 9 to pivot point 50 on the gate and since the point 49 is restrained, the point 50 and gate 45 swing about point 49 as a pivot and the gate moves to its closed position, shown in Figure 18. The same thrust lowers the platform 45 when the arm or connector 37 is unlatched, as will be seen in Figure 19.

When the gate is in the lowered position, for example, that of dotted lines in Figure 1, and it is desired to raise the gate, pressure is introduced below the piston 66, that is to say, on the left-hand side of the piston, as shown in Figure 11. The piston is then drawn inwardly into the cylinder, and thus the gate is raised to the full line position of Figure 1. When the gate is to be lowered from the raised position, pressure may be introduced on the opposite side of the pistons, that is to say, above the piston on the right-hand side of the piston, as shown in Figure 11. When that is done, the piston is forced to the left, and the piston rod is forced outwardly with respect to cylinder 19, and the gate is moved toward the lowered position positively. Frequently, positive movement is unnecessary, and the gate, or the gate and its load, will descend in the lowering direction by gravity alone. In that case, the gate is permitted to descend by gravity alone.

When the gate is in the raised position, and the latch parts 90 of the latches 88 and 89 are engaged, respectively, with the latch hooks 40 and 41, the gate is held in the raised position. The latches are shown in detail thus engaged in Figures 6 and 9. They are shown generally so engaged in Figures 1 and 3. With the latches thus engaged and holding the gate in the raised position, if pressure is now introduced on the right-hand or upper side of the piston, the piston will be forced outwardly to the left from the position of Figure 11. The valve 58 is shown in Figure 11 in the position of adjustment required to accomplish this movement. If the gate were not latched in the raised position at the time the pressure fluid is directed, as shown in the diagram of Figure 11, the gate would be moved downwardly, as will be seen in Figure 19. Since, however, it is latched in the upper position, it cannot move downwardly, and movement of the piston in the outward or lowering direction causes elongation of the telescopic central members 9, 10. When this movement is to occur, the latch structures, shown in Figures 4, 5 and 10 stand unlatched, and the movement from the position of Figure 10 to that of Figure 4 may occur in response to outward movement of the piston. When this occurs, the inner telescopic arms are lengthened by a distance sufficient to rotate the gate from the generally horizontal, raised position of Figure 1 to the generally vertical, closed position of Figure 3.

The above explanation points out the fact that the gate is moved from the lowered to the raised position by the movement of the piston 66, and it points out the fact that the gate is moved from the raised position to the closed position by the movement of the same piston 66 in an opposite direction. The piston 66 moves inwardly with respect to the cylinder 19 to raise the gate from the lowered to the raised position, and the same piston moves a shorter distance, but outwardly with respect to the cylinder 19, when the gate is moved from the raised, horizontal position to the closed, vertical position. Thus, the same power means which raises and lowers the gate serves also to close and to open the gate. When the gate is to be opened from the closed position in Figure 3, the valve 58 is so adjusted as to supply pressure to the outer or left-hand side of the piston 66. The piston is then restored to the position which it occupies when the gate is in the raised and generally horizontal position.

The various positions of the valve assembly for accomplishing the movements above described are shown in Figures 11, 12 and 13. When the valve 58 is in the position of Figure 11, pressure is supplied to the right or upper side of the piston 66, as shown in that figure, and if the arms 37 and, consequently, the arm structure as a whole, are latched in the raised position, movement of the piston will close the gate, raising it from the generally horizontal to the generally vertical position. If, with this setting of the valve, the latches are disengaged, movement of the piston to the left from the position of Figure 11 will lower the gate.

When the valve 58 is positioned as shown in Figure 12, the gate will be raised. With the valve in this position, pressure fluid is introduced on the left or downward side of the piston, and the piston is moved to the right with respect to the cylinder 19 and the gate is raised. After the gate has been raised and closed, if the valve is moved to the position of Figure 12, the gate will be moved from the position of Figure 3 to the full line position of Figure 1, that is to say, from the closed to the open position. Thus, movement of the piston in one direction will lower the gate if unlatched or will close it if latched. And movement of the piston in the opposite direction will raise the gate or will open the gate if the latter has been previously raised unclosed.

When the valve is moved to the portion of Figure 13, pressure fluid is by-passed from the cylinder and moves merely from the pump to the reservoir or sump. Both conduits 68 and 70 are closed and fluid is retained in the piston and cylinder system, and the piston and gate are held stationary in the position which it occupied at the time at which the valve 58 was moved to the "hold" or by-pass position of Figure 13. If excessive pressure should occur at any time on either side of the system, one or the other of the relief valves 73 will open and permit the escape of pressure fluid back through the valve housing to the sump or reservoir. This will, of course, occur irrespective of the position or setting of the valve 58.

The control mechanism for operating the valve to control the direction and movement of pressure fluid and for operating the latch mechanisms is indicated generally throughout and in particular in Figures 2 and 6 to 9 inclusive. As shown in Figure 2, a control shaft 86 is provided at each end with an operating or control lever 97. Positioned about the shaft 86 is the tube 87. Adjacent the ends of this tube are fixed the latch members 88 and 89. The lever 65 is secured to the rod 86, preferably adjacent the latch 89, and the lever 85 is secured to the rod 86, preferably adjacent the latch member 88. Movement of either of the levers or handles 97 moves the rod 86 and the levers 65 and 85. As pointed out above, the lever 65 is connected by a wire 60 to the valve lever 59 which controls the valve 58, and thus movement of the handle 97 moves the valve. Also, as pointed out above, the lever 85 is connected by the wire 81 to the latching or holding member 28, and movement of the handle 97 and the rod 86 will move the holding member 28 to control the position of that member. Thus, by movement of the rod 86, the valve is positioned to cause the desired movement of the lift gate, and if the lift gate is to be moved to the closed position to the open position, the movement of the rod is such that the latch controlling member 28, which is effective to hold the telescopic arms 9, 10 in their extended position, is moved to permit their return to the short or unextended position.

The valve and the holding means which control the return of the telescopic arms from the extended to the shortened position must operate in proper relation to the latch means by which the arms carrying the gate are latched or unlatched, either to hold them in the raised position or permit them to return from that to the lowered position. The positions of the control handles 97 are indicated in Figures 6 to 9, inclusive. The full line position of the handle, which is designated II in Figure 6, is the hold position, and when the handle is in this position, the valve is in the position of Figure 13. This is the position usually to which the controls are moved when the gate has been raised to the full line position of Figure 1 and is to be retained there. It would be used anywhere intermediate the top or bottom limits of the movement of the gate to hold the gate in the desired position. As shown in Figure 6, however, the gate is in the raised position, the arms 37 having moved up sufficiently to permit the latch hook 40 to engage with the latch 88. The position of the parts just described also appears in the sectional view of Figure 9.

As shown in Figure 7, the parts have been moved only sufficiently to release the latch structure. The handle or operating lever 97 has been moved clockwise from the direction of Figure 6. In this movement, the member 96, carried by the lever 85, has moved the latch member 88 also clockwise, and has thus moved the latch sleeve or tube 87 against the resistance of the springs 91. This movement carries the two latches 88 and 89 out of engagement with the latch hooks 40 and 41. When this mvement has occurred sufficiently for the stop 94 to clear the lug 44 on the latch hook 40, that stop is carried to the downward position of Figure 7 in which it contacts the lug 44, and thus prevents undesired relatching.

If the handle is moved from the position of Figure 7 to that of Figure 8, the parts are then adjusted for lowering of the gate. The valve 58 is then moved to the position of Figure 11, and if the parts are unlatched in this position, the gate is lowered until it contacts the ground, or until the lever adjustment is changed, to the hold position or to some other position.

If the lever 97 is moved to the position of Figure 8, without having first been moved to the position of Figure 7 for unlatching, then the parts will remain latched, and the movement of the valve to the position of Figure 11 will result in movement of the piston in the same direction, but this movement will be effective to move the gate from the horizontal position of Figure 1 to the vertical or closed position of Figure 3. In this closed position, the rubber bumper or buffer 51 is brought into engagement with the stop or abutment 54. The amount of movement is sufficient to exert compression on the member 51 and on the other gate parts, and thus the assembly is held in tight position to prevent looseness and rattling, and thus the simple handle 97 by movement in this case through an arc of approximately 35° controls all the operations connected with the raising and lowering and closing and opening of the lift gate.

There is shown in Figures 4 and 5 a mechanical holding means for holding the telescopic arms in their extended position. There is shown in Figure 14 a hydraulic means for holding the telescopic arms in extended position. The present invention is in no way limited to the inclusion of such holding means. Many different types of holding means might be used and in fact the holding means might be entirely dispensed with. The provision of means for holding the telescopic arms in extended position is a convenience and not a necessity.

When the gate is in the raised position, it is desirable that it be held in that position by some latching or comparable means which will hold it up irrespective of the continuation of pressure within the cylinder 19. If the gate is to be moved to the closed position, it is essential that some such latching or holding means be provided. The hooks 40 and 41 which engage latches 90 are suitable means for latching the gate in the raised position. These latching means might however be located anywhere in the total assembly. Some such means is essential to permit movement of the gate to the closed position. This latching means is effective when the gate is to be moved to the closed position to change the direction of movement. In the absence of latching, the gate would be lowered to the dotted line position of Figure 1. When latching is effectively accomplished in the raised position of the gate assembly then the same movement of the piston which would otherwise have caused lowering of the gate assembly is effective to cause closing of the gate. The latching of the gate assembly in the raised position is therefore essential to accomplish this closing movement and any mechanism which effectively causes the latching and permits the translation of movement necessary to accomplish closing the gate is within the contemplation of this invention.

It is important to provide power means for moving the gate to the closed position of Figure 3 and the means provided for that purpose comprise the same piston and cylinder assembly which accomplishes the raising of the gate. Once the gate has been closed, it might be held in closed position by any means. The ordinary chain used on the ordinary tail gate could be added. Other means might be used.

If pressure is maintained in the piston and cylinder assembly and no leakage occurs, the arms which cause the closing movement would remain in the extended position and the gate would be held in the vertical, or closed, position without any added means, either for fastening the gate up in closed position or for holding the telescopic arms in extended position.

Thus the gate may be held closed in a variety of ways and by a variety of means and the invention is not limited to means for doing so. If a means is provided for holding the gate closed, it may be convenient to embody that means in a device which retains the telescopic arms in extended position but the invention is not limited to any such feature.

In case a means is provided for holding the telescopic arms in extended position, that means may be mechanical in the form of the latch shown in Figures 4 and 5, and it may be hydraulic in the form of the holding means shown in Figure 14. Generally, where either of these types of holding means are provided, they are referred to as holding means. They have also been referred to as latches. The mechanical form of the holding means is such that it can accurately be described as a latch. The hydraulic form is not truly a latch. Generally, the function of one or another of these members is to hold the arms in extended position and for that reason, the expression "holding means" appears in the claims and refers to some means for holding the telescopic arms in extended position, whatever those means may be.

In the use of the modified holding means shown in Figures 14, 15 and 16, hydraulic means are used instead of mechanical means for holding the telescopic arms in extended position. The telescopic arms move to extended position in the manner described above. When the gate assembly is in the raised position and is latched in that position, the piston within the cylinder 19 is caused to move to extend the telescopic arms from their short position to their full extended or lengthened position. In moving to that length-ened position, they move the gate from the horizontal to the vertical or closed position and so long as the telescopic arms remain in or are held in the extended position they retain the gate closed.

As the controls are operated to move the piston 66 to close the gate, pressure from the cylinder fluid 19 is discharged through the conduit 105 and into the cylinder 100 on the left hand side of the piston 101 as shown in Figure 14 and it moves, or tends to move, the cylinder outwardly as the telescopic members 9 and 10 move respectively to the extended position.

When the gate has been carried to the closed position of Figure 3, the telescopic arms will be held in the extended position as long as sufficient pressure is exerted in the cylinder 100 to hold the piston in the outward position. The sufficient degree of pressure may be maintained in the cylinder 100 by keeping the valve 58 in such position that pressure fluid is constantly directed through the conduit 105 into the cylinder 100. Pressure fluid under sufficient pressure to maintain the telescopic arms in extended position may also be maintained in the cylinder 100 by permitting the valve 108 to occupy the seated position of Figure 16. Then pressure fluid is held within the cylinder 100 and the telescopic arm members are held in extended position. This is a condition which prevails when the control member 97 is moved to the "hold" position in which no movement of the gate is desired or takes place.

To open the gate when the holding means of Figures 14 and 15 is used, the following sequence of operations is carried out; the handle 97 is moved first to the position marked III in Figures 6 to 9 inclusive. This moves the valve 58 to the position of Figure 12. This movement simultaneously carries the cam 117 to depress the pin 111 to unseat the ball 108 in the ball check valve of Figure 16. Thus fluid escapes from the cylinder 100 through the conduit 105 and passes through one end of the cylinder 19 and returns to the reservoir. When pressure is thus released from the cylinder 100, the piston 101 is no longer held in the outward position and the telescopic members may return from the extended to the shortened position.

If now the gate, after having been moved to the open position, is to be lowered from the raised position of Figure 1 to the dotted line position of that figure, the handle 97 is moved to the latch release position of Figure 7. When the handle 97 is in this position, the latch is released as described above and thus the two hooks 40 and 41 are out of engagement with the latches 90 which are thus held in inoperative position. When the parts are in the position of Figure 7, the members 94 prevent re-engagement of the hooks 40 and 41 with the latches 90. From this position of adjustment, the handle 97 is moved to position 1 of Figure 8 and it thus moves the valve 58 to the position of Figure 11 and pressure is discharged from the pump through the conduit 68 to the right hand side of the piston as shown in Figure 11 and moves the piston outwardly and so carries the gate to the lowered, or ground-contacting position. But during this part of the operation whatever pressure may develop within the cylinder 100 and to the left of the piston 101 as shown in Figure 14, is insufficient to overcome or seriously to resist the movement of the piston 66 or the weight of the gate and gate-carrying parts all of which act to lower the gate.

We claim:

1. In combination in a lift gate, a gate member, a base member adapted to be mounted upon a support, a plurality of supporting members movably connected to said base member and to said gate member, one member being of fixed length, another member being of variable length, a piston and cylinder assembly connected with said gate to raise and lower said gate, means for furnishing pressure fluid to said cylinder, valve means for controlling the direction of fluid flow to said cylinder, said piston and cylinder assembly being effective to raise and lower said gate, means for latching said gate in raised position, said piston and cylinder assembly being effective when said gate assembly is latched in raised position to extend the member of variable length to increase its length and thereby to move said gate to closing position, and unitary control means connected to said latch means and to said cylinder and adapted in a single movement to adjust the flow of pressure fluid to said cylinder and to operate said latch.

2. In combination a gate and means for raising and lowering it and for closing it, said means including a plurality of pairs of arms, a base for said arms, said arms connected to said base and to said gate and a double-acting hydraulic piston and cylinder assembly connected to said base and connected to said arms of variable length, means for latching said arms and the gate in raised position, means for supplying pressure fluid to said cylinder in a direction to raise said gate and in a direction to lower said gate at will, and means for extending said arms of variable length, said extending means comprising said latching means and said piston and cylinder assembly, said arms of variable length being effective when extended to close said gate.

3. In combination a gate member, a base, a supporting linkage including a plurality of arms pivoted to said base and to said gate, at least one arm being of variable length, a piston and cylinder assembly movably mounted on said base and connected to apply a raising and lowering thrust through said linkage, means for directing pressure fluid to said cylinder to move said piston in predetermined directions with respect to said cylinder to raise and lower said gate at will, means for latching said gate in raised position, the movement of said piston in the normal lowering direction being effective when said gate is latched in raised position to extend said arm of variable length to move said gate to closed position.

4. In combination, a gate, a base, and means for raising and lowering the gate and for tilting the gate with respect to the base to close it, said means including a pair of arms mounted upon the base for swinging movement, one of said arms being of variable length, and the other of said arms being of substantially fixed length, said arms being operatively connected to the base and to the gate, a reversible power actuator operatively connected to the base and to said arm of variable length, means normally effective for operating said actuator in one direction to raise said gate and in another direction to lower said gate at will, releasable means for latching the arm of fixed length against swinging movement when the gate is in a raised position, and means for varying the length of the arm of variable length when the arm of fixed length is so latched, said means for varying the length of said variable length arm comprising said latching means and said reversible power actuator, the arm of variable length being effective when its length is so varied, to tilt the gate and close it.

5. In combination a gate member, a base, a supporting linkage including a plurality of arms pivoted to said base and to said gate, at least one arm being of variable length, a reversible power actuator mounted on said base and connected to apply a raising and lowering thrust through said linkage, means for operating said actuator in predetermined directions to raise and lower said gate at will, means for latching said gate in raised position, the movement of said actuator in the normal lowering direction being effective when said gate is latched in raised position to extend said arm of variable length to move said gate to closed position.

6. A platform raising and tilting assembly adapted to raise and tilt a load-carrying platform with relation to a base, including a plurality of connectors adapted for connection to said base and to said platform and adapted to support said load-carrying platform during raising and tilting movement thereof with respect to said base when operatively connected between said base and said platform, a reversible power actuator adapted for operative connection with said platform whereby movement of said actuator in one direction is normally effective to raise said platform and in another direction is normally effective to lower said platform when said reversible power actuator is operatively connected to said base, at least one of said connectors being extensible to increase its effective length between said base and said platform, said actuator being connected to apply raising and lowering forces to the platform through the connection between said platform and said one connector, means for restraining movement of another of said connectors at one raised position of said platform whereby actuation of said power actuator in said lowering direction is effective, during such restraint of said other connector, to increase the effective length of said one connector to tilt said platform with relation to said base.

7. A platform raising and tilting assembly adapted to raise and tilt a load-carrying platform with relation to a base, including a plurality of connectors adapted for operative connection to said load-carrying platform for supporting the load-carrying platform for raising and tilting movements with respect to said base when operatively connected thereto, at least one of said connectors being of variable effective length and having a minimum length coordinated with the length of another of said connectors to maintain the platform in generally parallel planes during raising movement of said platform, a reversible power actuator adapted for connection with said platform and adapted for connection to said base, and operatively interconnected with said connector of variable length to apply a thrust through the connection between said platform and said connector of variable length, whereby movement of said actuator in one direction is effective to raise said platform with respect to the base, means for restraining movement of said other connector at a raised position of said platform whereby reverse actuation of said power actuator when said other connector is so restrained is effective to lengthen the said connector of variable length to tilt said platform with respect to the base.

8. A platform raising and tilting assembly adapted to raise and tilt a load-supporting platform in relation to a base, including an operating linkage adapted to be operatively connected with said base and with said platform, said linkage including a plurality of platform supporting members which, when the linkage is operatively connected to the platform and to the base, provide a two-point connection of said platform to the base, with one of said points of connection being disposed above the other when said platform is in a lowermost position and when in a raised position, means for mounting said platform supporting members for swinging movement with respect to the base to maintain said relationship of said points of connection during raising and lowering movements of the platform, one of said supporting members being extensible and one of said supporting members being of substantially fixed length, means for latching said platform in said raised position, and a reversible power actuator adapted to be operatively connected to said base and to said platform and effective normally to apply, when moved in one direction, a raising thrust to the platform through the point of connection between the extensible supporting member and said platform, said actuator being effective, when moved in the opposite direction with said platform latched in said raised position, to extend said extensible member and to tilt said platform about an axis passing through said point of connection between the member of fixed length and the platform.

9. In combination a gate, a base, and means for raising and lowering the gate and for tilting the gate with respect to said base, said means including a plurality of pairs of arms, at least one of said arms of each pair being of variable length, said pairs of arms being mounted upon the base for swinging movement and operatively connected to said gate, and a reversible power actuator operatively connected to said base and to said arms of variable length, means normally effective for operating said actuator in one direction to raise said gate and in another direction to lower said gate at will, releasable means for latching the other arm of each pair against swinging movement when the gate is in a raised position, and means for extending said arms of variable length when the other arms are in latched position, said extending means comprising said latching means and said reversible power actuator, said arms of variable length being effective when extended to tilt the gate and close it.

GLENN A. DUIS.
GLENN S. PARK.

References Cited in the file of this patent

UNITED STATES PATENTS

| Number | Name | Date |
|---|---|---|
| 2,075,954 | Osgood | Apr. 6, 1937 |
| 2,391,813 | Wood | Dec. 25, 1945 |
| 2,469,421 | Wood | May 3, 1949 |
| 2,480,528 | Wachter | Aug. 30, 1949 |
| 2,525,424 | Novotney | Oct. 10, 1950 |
| 2,576,881 | Kern | Nov. 27, 1951 |
| 2,593,240 | Anthony et al. | Apr. 15, 1952 |
| 2,603,374 | McNamara, Jr. | July 15, 1952 |
| 2,624,477 | Messick | Jan. 6, 1953 |
| 2,626,067 | Berford et al. | Jan. 20, 1953 |